Aug. 10, 1965  R. L. VON REPPERT  3,199,972
PRODUCTION OF MICROPULVERIZED PHOSPHATE FERTILIZER
Filed July 25, 1961
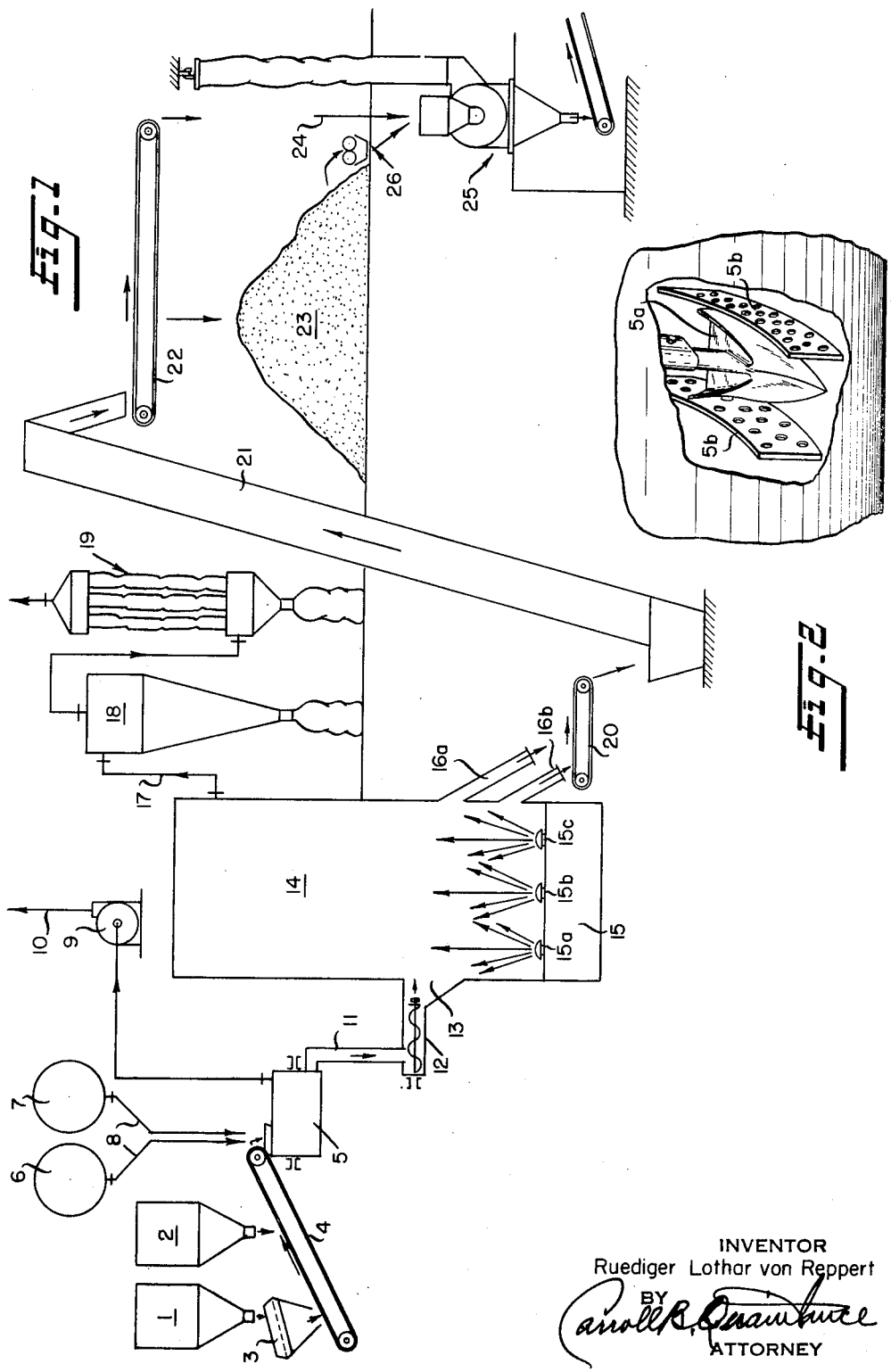
INVENTOR
Ruediger Lothar von Reppert
BY
ATTORNEY

United States Patent Office 3,199,972
Patented Aug. 10, 1965

3,199,972
PRODUCTION OF MICROPULVERIZED
PHOSPHATE FERTILIZER
Ruediger Lothar von Reppert, Wiesbaden, Germany,
assignor to Chemische Werke Albert, Wiesbaden,
Biebrich, Germany, a corporation of Germany
Filed July 25, 1961, Ser. No. 126,530
5 Claims. (Cl. 71—37)

This invention relates to an improved partially decomposed micropulverized phosphate fertilizer and its production.

For the most part phosphate fertilizer is used in the form of superphosphate and triple superphosphate. Very finely ground powdery, or micropulverized, raw phosphate is used on a smaller scale. Each of these known types of fertilizers has decided disadvantages. In superphosphates and triple superphosphates, the $P_2O_5$ content is available largely in the citrate and water soluble state. This makes the fertilizer immediately and readily available as a plant food to stimulate the early growth of the plant. On the other hand, the ready solubility of the $P_2O_5$ content of the fertilizer results in much of it being lost by being washed away by rain water, or by irrigation water, and considerable amount of the $P_2O_5$ may be lost as a plant food by being chemically bound to iron or aluminum or other substances forming insoluble phosphates. Normally the superphosphate is used in excess of the amount necessary to stimulate the early growth of the plant in an effort to provide phosphatic plant food for an extended period of time or throughout the growth of the plant. This manner of providing phosphatic plant food is often unsuccessful and is inefficient for the readily soluble $P_2O_5$ will be dissipated in the manner mentioned above and is often exhausted before the plant reaches full growth.

For the most part, raw phosphates may be considered to fall in two categories, namely, soft and hard. The soft phosphates are widely distributed in North Africa and often are called Gafsa phosphates, after a town in Tunisia, while the hard phosphates are typified by the Florida (U.S.A.) Pebble phosphates. In these raw phosphates, only citric acid soluble $P_2O_5$ is available, typically 40% of the $P_2O_5$ content in the Gafsa phosphate and only 25% of the $P_2O_5$ content in the Florida pebble phosphate. This means, of course, none of the $P_2O_5$ is sufficiently soluble to be readily available as a plant food to stimulate the early growth of the plant. Thus the micropulverized raw phosphates are suitable only for use as a deferred, or stored, source of phosphatic plant food. In the case of the hard Florida pebble phosphates, they are not very satisfactory even as a deferred source of plant food for even after the finest possible grinding they scarcely exert a fertilizing effect on the soil when it is weakly acidic, neutral or alkaline. As a result, phosphate dust, or flour-like powder, made from Florida pebble phosphates is stored in the soil for a long time before it becomes available as a plant food, if at all, which means, depending on the pH of the soil, after a period up to several months, or even years. The availability of this type of micropulverized raw phosphates can be enhanced by the joint use of phosphoric acid or superphosphates but this involves obvious complications in application of the fertilizer to the soil. The effect of the hard finely ground raw phosphates is somewhat better in extremely acid soil but this means a very restricted use as a fertilizer.

The finely ground soft raw North African Gafsa-type phosphates are somewhat more suitable as a stored, or deferred, source of phosphatic fertilizer but it still does not provide $P_2O_5$ in a sufficiently readily available form to exert a starting effect on the plant. Yet the finest pulverized Gafsa phosphate, from which 90% pass a 10,000 mesh/cm.² sieve, is being sold in a large scale in Europe and South America under the trade name of "Hyperphos." Typically this "Hyperphos" contains 11% citric acid soluble $P_2O_5$ and a total $P_2O_5$ content of 29%.

Ground basic slag contains no water soluble or citrate soluble $P_2O_5$ so such materials, also, cannot offer plants the very important, and often indispensable, initial growth imparting phosphatic plant food.

It is known that the optimum effect of a phosphate fertilizer is only obtained when it contains in addition to citric acid soluble $P_2O_5$ both citrate and water soluble $P_2O_5$. It is also known that highly soluble superphosphates are inefficient for the reasons given above. As a result, efforts have heretofore been made to obtain phosphate fertilizers with a $P_2O_5$ content having the three degrees of solubility mentioned above by subjecting raw phosphates to partial attack with acids. In accordance with these prior art practices, however, roughly granulated products have been obtained which cannot be ground into the finely pulverized size needed for their successful use due to the fact the treated products are plastic and merely smear when attempts are made to grind them into the micropulverized sizes. These disadvanageous characteristics are apparently due to a relatively high content of free acid and water. The disadvantageous physical characteristics of these known partly attacked raw phosphates may be attributable to one, or more, of the following causes, namely, use of improper amounts of acids, inadequate contact between the acid and the raw phosphate to assure uniformity in the reaction product, and improper drying procedures.

It is an important object of this invention to provide a phosphate fertilizer containing balanced quantities of citric acid, citrate and water soluble $P_2O_5$ and in a physical form most conductive to its efficient use. It is a special object of the invention to provide a phosphate fertilizer which has sufficient readily available $P_2O_5$ to be used by the plant at once but insufficient to provide an excess which will be dissipated in the manner set out above. It is another special object of the invention to produce a phosphate fertilizer which contains sufficient easily absorbable phosphoric acid to impart a quick growth to the young plant while retaining a further supply of more difficulty dissolved phosphoric acid adequate to supply the necessary phosphoric acid to the plant throughout its period of growth. It is yet another special object of the invention to obtain the objectives of this invention by treating a raw unground granulated and at times moist raw phosphate from which particles larger than 1 mm. have been screened off. It is a further special object of the invention to provide a process whereby the above noted objectives can be obtained including the production of a micropulverized product having particle sizes comparable to those of the so-called Thomas meal but having greater quantities of citric acid, citrate, and water soluble $P_2O_5$. More specifically it is an object of this invention to provide a micropulverized and incompletely acid decomposed raw phosphate fertilizer with at least 90% of its particles passing through a 1,600 mesh/cm.² sieve and up to 100% passing through a 10,000 mesh/cm.² sieve which contain up to 80% of citric acid soluble $P_2O_5$ and up to 60% of citrate and/or water soluble $P_2O_5$. It is a particular object of this invention to obtain the aforesaid product from hard raw phosphates such as raw Florida pebble phosphates. Other objects and advantages of the invention will become apparent from the more detailed description which follows.

Broadly considered, the objects of this invention are obtained by thoroughly and intensively mixing a granular raw phosphate having a maximum particle size of 1 mm. with at most 50% of the quantity of a mineral acid (preferably sulfuric acid or phosphoric acid) theoretically required to fully convert the raw phosphate, promptly cooling the reaction product and then micropulverizing the cooled product. More particularly a fine granular, but not micropulverized, raw phosphate having its particles less than 1 mm. in size is treated with up to 50% of the amount of mineral acid theoretically necessary to completely decompose the raw phosphate in a reaction chamber while subjecting the raw phosphate and acid to the stirring and mixing action of a stirrer which exerts both a slinging and whirling, or centrifugal, action; then cooling and drying the hot reaction mass, and finally micropulverizing the cool and dry product to the particle size mentioned above. It is not necessary that the raw phosphate be completely reacted in the first step of the process but the reaction should be predominantly carried out in the first step. It is necessary, however, in order to obtain the full advantages of the process that the hot reaction product obtained in the first step be immediately thereafter cooled and dried in an apparatus which avoids agglomeration, or advantageously divides already formed agglomerates. This result can be achieved by subjecting the partially reacted product to a counter current stream of cooling gas (such as air for economic reasons) which imparts a whirling and tumbling action to the granular particles so that each particle is surrounded by the cooling gas. In this way, the heat of reaction is largely utilized, the reaction is carried to the point where hardly any free acid remains, the water present in the raw phosphate or any added with the aicd is removed, and a finished dry product is obtained which can be easily micropulverized as on a Raymond mill.

A specific embodiment of the process may be visualized involving the following steps:

(I) Ground, or unground, granulated and, if desired, moist raw phosphate having all particles less than 1 mm. is reacted with a mineral acid known to convert raw phosphates to soluble phosphates such as sulfuric acid, phosphoric acid, nitric acid or hydrochloric acid, preferably sulfuric and/or phosphoric acid. The amount of acid used does not exceed 50% of the amount theoretically required to completely decompose the raw phosphate. This reaction is carried out in a closed reactor provided with a stirrer having a mixing element akin to a spatula which exerts both a whirling and a flinging mixing action and also provided with a rubbing sheet. The resulting heat of reaction and any developed water vapor is exhausted through an exhaust tower mounted on the reactor and provided with an exhaust fan.

(II) The product obtained in the first step still largely composed of individual, partially attacked raw phosphate particles, is promptly treated with air in a cooling and drying apparatus which avoids agglomeration of the moist and warm particles. Preferably the apparatus is one which provides a whirling bed of single particles completely surrounded with cool air. The particles are thereby cooled and dried to the extent that they are readily grindable. This result may be achieved by contacting the particles countercurrently with impinging jets of air which impart a veil-like whirling aeration bed.

(III) The product now containing only unimportant quantities of free acid is readily micropulverized to form a phosphate fertilizer where at least 90% of the particles pass through a 1,600 mesh/cm.$^2$ screen and up to 100% will pass through a 10,000 mesh/cm.$^2$ screen.

In the above first step even hard granular pebble phosphates can be used in the fine, or finest pulverized state. Where the raw phosphate does not contain important quantities of moisture, the phosphoric acid, or preferably sulfuric acid is used in 60 to 66° Baumé concentration as the mineral acid. When using nitric acid on unground raw phosphates no water should be present due to the volatility of the nitrous oxide. In such instances it is more favorable to start with raw phosphate as dry as possible. The same is true when using hydrochloric acid.

It is advantageous to use unground raw phosphate in a moist condition due to the more thorough acid attack possible with such materials. Upon spraying the moist raw phosphate with the acid an increase of the reaction temperature results which rises further upon the continued reaction of the acid with the raw phosphate. When using such moist raw phosphates more concentrated acids should be used such as 96–98% sulfuric acid and concentrated phosphoric acid or their mixtures. On the other hand, when using such concentrated acids any necessary additional water may be added at the same time as the acid or after the addition of the acid. When operating with dried unground raw phosphates or without supplementary water, it is advisable to use 60° Baumé sulfuric acid.

The treatment of the unground raw phosphate can be improved by using hot acids.

It should be borne in mind that the product obtained in step I cannot be crushed or ground to the necessary small particle size. On the other hand the product obtained in step II can be ground without any difficulty, for instance, on a Raymond mill so that 90–100% will pass through a 10,000 mesh/cm.$^2$ screen. The resulting product represents the finest ground type of phosphate fertilizer, is free-flowing, and does not cake on storage. Due to the fact that the fertilizer is micropulverized all the various forms of available phosphoric acid can be efficiently utilized in the soil so that a fertilizing effect is obtained which has not been obtainable heretofore to the same extent.

The finished product can contain up to 60% of the total $P_2O_5$ as citrate or water soluble $P_2O_5$ and up to 80% in the citric acid soluble form.

It should be understood that the present process uses acids in a quantity which is less than that necessary to convert raw phosphates into superphosphates or triple superphosphates. Such phosphates cannot be ground into the micropulverized sizes specified herein and it is, therefore, quite surprising that the partly converted phosphates of this invention can be micropulverized. Thus the products of this invention have the important advantages over superphosphates that soluble phosphate is available for immediate absorption by the plant without excess being present to be dissipated and wasted by water seepage, or the like, while residual less readily soluble phosphate is available with varying degrees of solubility to supply the phosphatic need of plants over their period of growth. By varying the amount of acid and other conditions various degrees of solubility of the $P_2O_5$ content can be obtained which will be adapted to the growing season, or period, of various types of plant life. As compared to untreated micropulverized raw phosphates, as mentioned above, the important initial plant growth stimulating effect is present together with controlled relative amounts of $P_2O_5$ having other degrees of solubility.

With this method it is also possible to produce mixed binary or ternary fertilizers by adding, for instance, potash salts to the raw phosphate. Then the mixture is treated with the concentrated mineral acid in the way mentioned above. In addition to the partial attack of the raw phosphate a conversion of the phosphate salt, particularly potassium chloride, occurs so that potassium sulfate is formed and hydrochloric acid is freed which contributes to a further attack on the raw phosphate. Other nutritive elements in solid or fluid states can be added to the raw phosphate-potassium chloride mixture before it is treated. The addition of liquid nutritive elements, such as those serving for the ammoniation of the product in the form of ammonia solutions or ammonia, is better effected after the partial attack. It should be observed that free ammonia should be added only to the extent necessary to convert free sulfuric acid or phosphoric acid into ammonium sulfate or ammonium phosphate.

The products made in accordance with this invention can, if desired, be granulated in accordance with known methods, as by using water as a granulating liquid to which inorganic or organic binding agents can be added. On the other hand the granulation can take place with various dilute mineral acids. In spite of such granulation the fertilizer decomposes again in the soil into the form of the finest powder and its character and advantageous effects are totally retained.

The present invention can be further visualized by reference to the attached flow sheet, FIG. 1, and fragmentary view, FIG. 2, in which various pieces of apparatus are represented diagrammatically.

In the practice of the invention unground raw phosphate is taken from silo 1, the particles over 1 mm. size are sieved by a vibration screen 3 simultaneously, or alternatively, ground raw phosphate can be taken from silo 2. Raw phosphate is led by means of a conveyor belt 4 into a mixer 5 operating continuously according to the slinging and whirling method and supplied with a smoother-like shovel elements 5a and perforated rubbing sheets 5b. The mixer has a drum content of 2,000 liters and a volume content of 1,000 liters. The mixer is provided on the left top side with a filling aperture, on the right top side with a gas outlet stack 10 provided with an exhaust fan 9, and on the right side wall with an outlet conduit 11.

The acid for the attack on the raw phosphates is taken from the tank 6 or 7 containing, for example, 60 and 66° Baumé sulfuric acid, through conduits 8, and sprayed into the mixer 5 with its shaft rotating at a high speed of at least 30 r.p.m.

Then the material already treated in the mixer is led to a cooling and drying tower 14 by means of a worm 12 and over an air-intake casing 13. This tower is provided with an air-chamber 15 provided with air atomizers 15a, 15b and 15c which project streams of air upwardly and outwardly into the cooling and drying compartment of the tower 14. In this way, each particle is surrounded by air and the various impinging jets of streaming air impart a veil-like whirling and tumbling action to the hot particles so that they quickly become cool and sufficiently dry to be grindable without difficulty. The cool material passes through outlets 16a and 16b onto conveyor belt 20 and thence over a bucket conveyor 21 to a further conveyor belt 22 and either onto an intermediate storage area 23 and then into the crusher 25 or directly into crusher 25 through path 24. The material in the storage area 23 may be passed between crushing cylinders 26 to crush any agglomerated material formed during storage before being passed into the crusher 25 which, as stated, may be a Raymond mill. When the raw phosphate is not ground, the treated phosphate is preferably sent to the storage area 23 before being introduced into the crusher 25. The treated particles are readily micropulverized to the sizes set out herein in crusher 25. The finest dust particles carried off from the cooling and drying tower by the air flow are retained in cyclone 18 and dust filter 19 and are then fed to the finished product.

When the material is retained in an intermediate storage area it is preferably fed into the crushing cylinders before it is fed into the Raymond mill or other types of micropulverizing apparatus in order that the agglomerated material which may have been formed during storage may be broken up before it goes into the micropulverizing mill.

The micropulverized product can be either immediately filled into bags or may be stored up in silos without difficulties arising.

The invention will be further understood from the following illustrative examples. In certain instances the percentages of citric acid soluble $P_2O_5$, citrate soluble $P_2O_5$ and water soluble $P_2O_5$ are followed by larger percentages placed in parentheses. These larger percentages are related to the $P_2O_5$ content of the phosphate rather than to the percentage of the total phosphatic fertilizer composition, or mixture.

Example 1

Five tons per hour of a pebble phosphate ground so that 72% will pass a 1,600 mesh/cm.² screen and containing 32.6% of total $P_2O_5$ and 9.5% citric acid soluble $P_2O_5$ (29.1%) are mixed with 24% of 66° Baumé sulfuric acid (97% $H_2SO_4$) which means 1164 kilos of $H_2SO_4$. The mixing takes place in the apparatus described above and continues for 6 minutes. At this time certain gases are liberated and these gases and water vapor are exhausted in the manner described previously. Then the hot reaction products are led to the cooling and drying tower described in the flow sheet. The cooling stream of air removes the moisture in the manner described above and the attack with the acid is completed.

An analysis of the particle size of the product obtained from the cooling tower shows that 53.4% pass a 1,600 mesh/cm.² screen and the product contains 26.4% total $P_2O_5$ of which 15% is citric acid soluble (57%), 9.4% is citrate soluble and 9.2% is water soluble. The product also contains 2.1% free acid and 1.5% water.

After a short storage in a storage area the obtained product is passed through crushing cylinders to remove lumps in the manner described and then is led into a Raymond mill. The material is ground without difficulty to a fineness so that 90% pass a 10,000 mesh/cm.² screen. As a result a finest type of micropulverized phosphate fertilizer is obtained with 27.2% total $P_2O_5$ content and with 16.2% of citric acid soluble $P_2O_5$ (59.5%) and 9.2% citrate acid soluble $P_2O_5$ of which 9.0% is water soluble. The product now contains only 1% free acid and 1.4% water.

The fertilizer of this example has been produced on a large production scale and possesses all of the qualities of good and effective phosphate fertilizer and can be used with great success on all soils. It imparts a very high starting effect upon plant life due to its high content of citrate and water soluble $P_2O_5$. In this respect it compares favorably with the superphosphates. Losses of $P_2O_5$ due to combining with materials which render it water insoluble or losses through being washed away by rain do not occur. The residual $P_2O_5$ being in a micropulverized size represents a phosphorous reserve which can be absorbed by the plant in the necessary quantity during the whole period of its growth.

It has been found that this new fertilizer is not only suitable for fertilizing corn and other grains and peanuts but also for the cultivation of fruits and vegetables.

Example 2

A Morocco phosphate (70% tricalcium phosphate) used for production of superphosphate and ground so that 69.32% pass a 1,600 mesh/cm.² screen and 18.92% pass a 10,000 mesh/cm.² screen is well mixed with 25% of a 60° Baumé sulfuric acid in an intensive mixer operating in accordance with the procedure described in the body of the specification. This Morocco phosphate contains 32.4% of total $P_2O_5$ of which 8.6% is citric acid soluble and 1.1% water soluble. Afterward the warm reaction product is treated in the cooling and drying tower described in the body of the text. In these two steps a good attack on the phosphatic material is obtained while the warm to hot reaction product is cooled rapidly and its moisture removed. A product is obtained which is less rough than the finished product with 60.5% passing through a 1,600 mesh/cm.² screen and 10.2% through a 10,000 mesh/cm.¹ screen. The prduct contains in addition to 27.6% of $P_2O_5$ a higher proportion of citric acid soluble $P_2O_5$, i.e. 15.4% against 8.6%, and 8.1% citrate and 7.9% water soluble $P_2O_5$. The content of free acid is only 0.7% and the product contains only 1.2% moisture.

In a third step this product is fed into a swing-hammer pulverizer where it is ground without any difficulty, without becoming plastic and adhering, to a fineness so that 92.4% passes through a 10,000 mesh/cm.² screen.

The finish product obtained in this micropulverized size contains 27.7% total $P_2O_5$, 16.9% citric acid soluble $P_2O_5$ and 8.1% citrate and 7.9% water soluble $P_2O_5$. The content of water is the same, namely, 1.2%, while the amount of free acid has been reduced to 0.35%.

In this way, a fertilizer is obtained possessing a good starting and a durable effect from Morocco phosphates which is normally ground so that 19% passes a 10,000 mesh/cm.$^2$ screen. The percentage passing a 10,000 mesh/cm.$^2$ screen has been increased to 90% while the percentage of citric acid soluble $P_2O_5$ which was originally 26.5% of the $P_2O_5$ content has been raised to more than 60% and the citrate and water soluble $P_2O_5$ has been increased to about 30%.

*Example 3*

In this example unground raw Florida pebble phosphate is used instead of the ground pebble phosphate used in Example 1 but the manner of treatment is substantially the same except that all of the particles over 1 mm. in size are first removed from the unground material. The screened unground material is treated with 97% $H_2SO_4$ in an amount equaling 1010 kilos of $H_2SO_4$ per 5 tons/hour. During treatment however sufficient water is added to reduce the concentration of the $H_2SO_4$ from 97% to 78%, i.e., 60° Baumé.

The untreated raw product contained in the unground state has 32.6% total $P_2O_5$ of which 6.8% is citric acid soluble which represents 21% of the total $P_2O_5$ content. On the other hand, the material treated in the manner described in Example 1, with the amount of sulfuric acid set out above, contained 26% $P_2O_5$ of which 14.6% was citric acid soluble (54.5%), 9.46% was citrate and 9.25% water soluble $P_2O_5$. In addition the material contained 1.8% free acid and 3.2% water.

After storage in a storage area where certain amounts of the product hardened, the lumps were eliminated by running them through a crushing cylinder and the material was then ground in a Raymond mill to finely micropulverized fertilizer in which 90% passes a 10,000 mesh/cm.$^2$ screen. The content of $P_2O_5$ now amounts to 27% while the critic acid soluble $P_2O_5$ content has been increased to 15.9% (59%), while the citrate soluble $P_2O_5$ has been increased to 9.56% and the water soluble content to 9.3%. The amount of free acid is only 1.3% and the water content is 1.8%.

It will be seen from the foregoing that is is possible to produce the products of this invention from Florida pebble phosphate without grinding the raw material. Thus even from unground raw phosphate a micropulverized phosphate fertilizer with all degrees of $P_2O_5$ solubility is obtainable which constitutes a valuable fertilizer with sufficient balanced starting and durable effects.

*Example 4*

In this example Gafsa phosphate is used and sieved so that all of it passes through a 1 mm. screen. In this way 4% of the material remains behind. The screened product contains 29.5% of $P_2O_5$ of which 1.3% is citric acid soluble (34.9%). This screened raw material is treated continuously in the manner described with 10% of sulfuric acid of 60° Baumé concentration. A product is obtained having the following analysis after treatment but before pulverizing, namely, 28.2% total $P_2O_5$, 11.7% citric acid soluble $P_2O_5$ (41.4%), 2.6% citrate and 2.4% water soluble $P_2O_5$ and 1.9% moisture.

Afterward this product is micropulverized so that 91.2% passes through a 10,000 mesh/cm.$^2$ screen. The analysis of the micropulverized phosphatic fertilizer obtained now contains 29.1% $P_2O_5$, 13.9% citric acid soluble $P_2O_5$ (47.6%), 3.4% citrate and 3.0% water soluble $P_2O_5$. The moisture content has sunk to 1.5%.

*Example 5*

A pebble phosphate is used in this example which is ground so that 87% passes a 1,600 mesh/cm.$^2$ screen. The pebble phosphate contains 75% $Ca_3P_2O_8$ and is homogeneously mixed in the manner described in the body of the specification with 30% sulfuric acid of 60° Baumé concentration. After the treatment but before the last grinding step a phosphate fertilizer is obtained containing 26.8% $P_2O_5$ 13.1% citric acid soluble $P_2O_5$ (48.8%), 10.5% citrate and 10.1% water soluble $P_2O_5$. The amount of free acid is 1.8% and the amount of water 2.7%.

After a short storage in the storage area the product is micropulverized so that 99.4% passes through a 1,600 mesh/cm.$^2$ screen and 88.7% passes through a 10,000 mesh/cm.$^2$ screen.

In this way a product similar to those produced from soft raw phosphates is obtained having 28.8% $P_2O_5$, 14.3% citric acid soluble $P_2O_5$ (49.7%), 10.5% citrate and 10.2% water soluble $P_2O_5$. The amount of free acid is now 1.7% and the amount of water is 2.2%.

This example demonstrates that it is possible according to this invention to produce from hard raw phosphates a a phosphate fertilizer which has exceptionally satisfactory plant physiological properties. Up to the present time hard phosphates could not be rendered effective by fine pulverization. This example demonstrates however that these hard types of phosphates can be pretreated and then ground so that they will be exceptionally effective. This constitutes a very surprising progress in the fertilizer art for the reasons given above.

The product of this example if desired can be converted into granular material by using the typical rotary table granulator. These granulated products are dust free and are very stable in storage. The general character of the fertilizer is not changed by the granulation for it still possesses the advantageous initial and durable effects while avoiding losses originating from fixation in insoluble forms or precipitation by water.

*Example 6*

In this example a binary fertilizer is obtained. Seventy parts of a Gafsa phosphate sieved through a 1 mm. screen but unground containing 29.5% of total $P_2O_5$ and 10.5% citric acid soluble $P_2O_5$ are mixed with 30 parts of a potassium chloride containing 57% $K_2O$ which is also sieved through a 1 mm. screen. This mixture is treated in the process described in the body of the specification with 30% of sulfuric acid of 60° Baumé.

After leaving the mixer in the first step a phosphate-potash is obtained containing 16.25% of toal $P_2O_5$, 13.12% citric acid soluble $P_2O_5$ (80%), 6.5% citrate and 6.4% water soluble $P_2O_5$, together with 1.4% free acid and 13.1% $K_2O$, as well as 5.3% water.

This product is treated in a second step in the whirling screen type of cooling and drying apparatus described heretofore and thereafter led to a grinding mill after a short period of storage in a storage area and ground to a fineness such that 89.6% passes a 10,000 mesh/cm.$^2$ screen.

The analysis of this micropulverized phosphate-potash fertilizer shows the following percentages:

| | Percent |
|---|---|
| Total $P_2O_5$ | 19.25 |
| Citric acid soluble $P_2O_5$ (81.5% of the total $P_2O_5$) | 15.8 |
| Citrate soluble $P_2O_5$ | 6.6 |
| Water soluble $P_2O_5$ | 6.4 |
| Free acid | 1.0 |
| $K_2O$ | 13.5 |
| $H_2O$ | 2.5 |

In this method of operation the sulfuric acid reacts with the raw phosphate and converts the potassium chloride into potassium sulfate and hydrochloric acid. The freed hydrochloric acid exerts further attacks on the raw phosphate. Thus the process of this invention is very effective in the production of a phosphate-potash fertilizer due to the fact that the process exerts a more effective attack on the phosphate and due to the further fact that the content of citric acid soluble $P_2O_5$ is importantly increased.

It will be seen from the foregoing examples that the acid treatments of this invention are easily capable of rendering up to 80%, and more, and at least 50% of the $P_2O_5$ content of the treated raw phosphate citric acid soluble while rendering up to 60% and at least 10% of the $P_2O_5$ content of the treated raw phosphate citrate and water soluble. By operating in this range it is possible to provide a balanced phosphatic plant food which will supply the needs of the young plant and, as well, its needs over the growing season.

It will be understood "granular" is used herein in describing the raw phosphate having all particles less than 1 mm. in size to indicate that the particles thereof are larger than the particles of the micropulverized flour-like treated products ultimately obtained.

The various examples are included solely as illustrative embodiments of the invention. Thus it will be apparent that the specific conditions disclosed may be varied widely and still fall within the scope of the invention as taught herein and as defined in the appended claims.

What is claimed is:

1. A method of producing a micropulverized phosphate fertilizer having a high content of citric acid soluble $P_2O_5$ and having sufficient citrate and water soluble $P_2O_5$ to exert a starting effect on plant growth, comprising adding to a granular raw phosphate having a particle size less than 1 mm. a mineral acid in a quantity of at least 12 and at most 50 molar percent of the quantity theoretically required for a full mineral acid conversion of the raw phosphate to superphosphate, subjecting the resulting mass of partially reacted raw phosphate in a mixing and reaction zone to a whirling and slinging action until the reaction between the acid and the phosphate has predominantly taken place, cooling and drying the resulting reaction product, and micropulverizing the dried and cooled product so that at least about 90% will pass a 1,600 mesh/cm.$^2$ sieve and up to 100% will pass a 10,000 mesh/cm.$^2$ sieve.

2. A method of producing a micropulverized phosphate fertilizer having a high content of citric acid soluble $P_2O_5$ and having sufficient citrate and water soluble $P_2O_5$ to exert a starting effect on plant growth, comprising adding to a granular raw phosphate having a particle size less than 1 mm. a mineral acid in a quantity of at least 12 and at most 50 molar percent of the quantity theoretically required for a full mineral acid conversion of the raw phosphate to superphosphate, subjecting the resulting mass of partially reacted raw phosphate in a mixing and reaction zone to a centrifugal and slinging action until the reaction between the acid and the phosphate has predominantly taken place, subjecting the hot reaction product to cooling and drying action of a countercurrent stream of whirling cooling gas, and micropulverizing the dried and cooled products so that at least about 90% will pass a 1,600 mesh/cm.$^2$ sieve and up to 100% will pass a 10,000 mesh/cm.$^2$ sieve.

3. A method of producing a micropulverized phosphate fertilizer having a high content of citric acid soluble $P_2O_5$ and having sufficient citrate and water soluble $P_2O_5$ to exert a starting effect on plant growth, comprising adding to a granular raw unground hard pebble phosphate having a particle size less than 1 mm. sulfuric acid in a quantity of at least 12 and at most 50 molar percent of the quantity theoretically required for the complete decomposition of the raw phosphate to superphosphate, subjecting the resulting mass of partially reacted raw phosphate in a mixing and reaction zone to a centrifugal and slinging action until the reaction between the acid and the phosphate has gone to substantial completion, cooling and drying a downwardly flowing stream of the hot reaction product with an upwardly and outwardly flowing stream of air, and micropulverizing the dried and cooled product so that at least about 90% will pass a 1,600 mesh/cm.$^2$ sieve and up to 100% will pass a 10,000 mesh/cm.$^2$ sieve.

4. The method of claim 3 in which the treated and dried phosphate is retained in a storage zone before being micropulverized.

5. A process for producing a micropulverized phosphate fertilizer having a high content of citric acid soluble $P_2O_5$ and having sufficient citrate and water soluble $P_2O_5$ to exert a starting effect on plant growth, comprising adding to a granular raw phosphate having a particle size less than 1 mm. a mineral acid in a quantity of at least 12 and at most 50 molar percent of the quantity theoretically required to completely convert the raw phosphate to superphosphate, thoroughly and intensively mixing the granular raw phosphate with the acid until the reaction between the acid and the phosphate has predominantly taken place, promptly cooling and drying the reaction product, and micropulverizing the dried and cool product so that at least about 90% will pass a 1,600 mesh/cm.$^2$ sieve and up to 100% will pass a 10,000 mesh/cm.$^2$ sieve.

References Cited by the Examiner

UNITED STATES PATENTS

| 1,034,090 | 7/12  | Dunham       | 71—40 |
|-----------|-------|--------------|-------|
| 1,445,167 | 2/23  | Plauson      | 71—37 |
| 1,871,416 | 8/32  | Broadfield   | 71—40 |
| 2,148,209 | 2/39  | Loiseau et al. | 71—40 |
| 2,308,220 | 1/43  | Waggaman     | 71—40 |
| 2,783,140 | 2/57  | Hignett et al. | 71—37 |
| 2,858,203 | 10/58 | Bellinzoni   | 71—61 |
| 2,968,833 | 1/61  | De Haven et al. | 71—64 |

OTHER REFERENCES

Chemical Engineer's Handbook, Perry, 3rd ed., 1950 pp. 1145–1147.

DONALL H. SYLVESTER, *Primary Examiner*.

GEORGE D. MITCHELL, ANTHONY SCIAMANNA, A. LOUIS MONACELL, *Examiners*.